United States Patent [19]
Busch

[11] Patent Number: 6,034,359
[45] Date of Patent: Mar. 7, 2000

[54] ELECTRICAL RESISTANCE COOKING APPARATUS WITH ELECTRONIC CONTROL

[76] Inventor: William J. Busch, 851 N. Manor Rd., Honey Brook, Pa. 19344

[21] Appl. No.: 09/245,325

[22] Filed: Feb. 5, 1999

Related U.S. Application Data

[60] Provisional application No. 60/073,814, Feb. 5, 1998.

[51] Int. Cl.[7] .................................................. H05B 1/02

[52] U.S. Cl. ........................... 219/497; 219/501; 219/509; 219/518; 219/497; 99/358; 99/342

[58] Field of Search ..................................... 219/501, 494, 219/497, 499, 505, 508, 509, 518; 99/358, 342

[56] References Cited

U.S. PATENT DOCUMENTS

| | | | |
|---|---|---|---|
| 4,554,440 | 11/1985 | Lee, Jr. | 219/501 |
| 5,928,546 | 7/1999 | Kramer et al. | 99/358 |

*Primary Examiner*—Mark H. Paschall
*Attorney, Agent, or Firm*—Famiglio & Associates; Robert B. Famiglio, Esq.

[57] ABSTRACT

This is an apparatus for producing prepared food by electrical conduction automatically as disclosed. A control circuit senses the rate of change of current conducted through food as a function of its cooked condition, stops the current to the electrodes in response to a decline in current value through the food as measured against a predetermined value, and automatically retracts the cooking electrodes and any hot plates which may be used in the cooking process by pneumatic means.

5 Claims, 8 Drawing Sheets

Fig-1

Fig_2

Fig_3

Fig-4

Fig_5

ELECTRICAL RESISTANCE COOKING APPARATUS WITH ELECTRONIC CONTROL

CROSS REFERENCES TO RELATED APPLICATIONS

This application claims the benefit of the filing date for the applicant's provisional application, serial number 60/073,814 which was filed Feb. 5, 1998.

FIELD OF THE INVENTION

The present invention relates to a cooking device for meat food items that are fairly uniform in thickness such as hamburgers, steaks, sausages, bacon and other meat products. The disclosed apparatus cooks such food products automatically and through the use of electrodes passing an alternating current through the food product. The automation includes a method to measure the level of completeness of the cooking process on the meat product, as well as raising one of the electrodes through the use of an automated hydraulic vertical press which opens to release the product being cooked when the level of "doneness" of the product reaches the preselected desired level. A pneumatic cylinder operates the moveable platen allowing optimum pressure to be exerted upon the product. The moveable platen also serves to open and close the apparatus to facilitate the insertion and removal of the food product. In addition to the cooking of the food product through the application of electrical current, the heated upper and lower electrode plates brown the surface of the product in contact with such plates to facilitate initial electrical contact with the product, necessary for the conduction of the AC current, and may otherwise allow browning of the product for cosmetic reasons. Current through the food product being cooked is being regulated by switching the primary of an AC power transformer from series to parallel operation and the opening of the press containing the upper and lower electrodes and ending of the electrical resistance cooking is accomplished by a current monitor and thermostatic switch.

DESCRIPTION OF THE PRIOR ART

Electrical resistance cooking in itself is well known in the prior art as many different United States patents disclose an apparatus for producing prepared foods by electrical conduction. One such apparatus for use in heating or cooking food through electrical conduction is disclosed in Korr et al., U.S. Pat. No. 3,842,724. Korr discloses rudimentary measurement of the electric current being used in the cooking process so that such current can be controlled thereby controlling the cooking of the food product being applied.

Marsh, U.S. Pat. No. 3,943,332 disclosed an apparatus and method for cooking food by transmitting an electrical current through the food product and further controlling the current being used such as to allow controlling of the cooking process itself. The apparatus disclosed provides control of the electrical current flow through the food product, it does not consider the level of cooking or the quality of the cooking process in its disclosure.

Lee, Jr., U.S. Pat. No. 4,554,440 disclosed a relationship between current flow through a food product, particularly meats, being cooked and the level of completeness of the cooking as a function of the current flow over time. Lee, Jr. taught an important relationship between the rate of change of current flow through an electrically cooked food product as against the state of doneness of such product being cooked electrically. By carefully measuring the rate of change of the current flow through the product being cooked, it is possible to determine the level of cooking which has elapsed and therefore control the cooking apparatus such that the user may obtain an optimum level of completeness in the cooking process depending upon the level desired.

Prior art does not teach the use of electrical current cooking, combined with measurement of the rate of change of the current flow through the food product while automating the physical apparatus which may compress the food product being cooked by the apparatus. The prior art also does not teach the combined use of heat elements on the electrode used to provide current through the food product thereby combining the use of surface heat and electrical current cooking to provide a superior cooking process. The disclosed invention also teaches how to automate the process to remove the cooking elements in heat plates from the food product after the cooking process has been completed. Also not found in the prior art is a cooking device which allows the switching control of the cooking process from a current flow rate of change measurement system to a temperature probe measurement system which can allow the operator to select the cooking control based on the internal temperature of a food product such as a larger steak or other meat product which may be denser or having a different consistency or texture than that of a hamburger patty product.

The prior art cooking devices and apparatus also do not teach the use of a press-like cooking apparatus such as disclosed in the instant invention. Much of the prior art uses a hinged lever type of housing to contain the hot plate surfaces or electrode surfaces which are used in the current conduction for cooking the food. The configuration discloses uses a vertical press-like frame which can be more successfully applied to fast food cooking apparatus and is more suitably configured for automated cooking cycles as disclosed with the present invention.

SUMMARY OF THE INVENTION

The present invention is an electrical resistance cooking apparatus having a pair of electrodes respectively connected to a source of alternating current controlled by an electronic apparatus and further comprising a hydraulic press configuration which facilitates the insertion and removal of the food product to be cooked. The apparatus controls the desired degree of doneness of the food product being cooked by measuring the rate of change of the electrical current being conducted through the food product thereby determining a preselected level of doneness and ending the cooking process automatically while opening the cooking apparatus by using the hydraulic control mechanisms to remove at least one of the cooking plates which serves as the current conducting electrode. In such a fashion, it is possible to construct a completely automated cooking apparatus which is particularly well suited to the fast food meat industry such as hamburgers and other meat patties that require rapid cooking with a uniform consistency as to the level of completeness of the cooking. With the apparatus disclosed, it is also possible to easily produce a fast food product, such as a hamburger patty, to a specified level of completeness to the customer's satisfaction without the need to monitor the product while it is being cooked.

The disclosed invention processes a food product, such as a meat patty or other similar meat products, by lowering the press type cooking panels which serve as upper and lower heated electrodes to make contact with the product to be cooked. The electrodes, after making contact with the food, causes a voltage to be applied across the food product, thereby introducing a current through the product to be cooked. The product is cooked when heat is created because of the product's inherent resistance. Through the electronic circuit disclosed, the current passing through the product is carefully controlled, and monitored, such that the level of doneness can be determined when the rate of change of the current flowing through the food product reaches a predetermined level. At such a level, the pneumatic press apparatus withdraws the electrodes from contact with the food product being cooked and allows the food product to be withdrawn for use.

In the preferred embodiment, the electrodes would serve as the cooking surface are preheated by a heating coil controlled by a fixed thermostatic switch in contact with the electrodes. By preheating the cooking surfaces, it has been found that the process of electrical cooking is enhanced and it also serves to apply browning through the food product for a desired effect. In the disclosed invention, a momentary closure of a start switch causes the controller circuit to energize the pneumatic solenoid valve, closing the press which consists of the cooking surfaces which serves as the electrodes. Simultaneously, voltage is applied across the electrodes causing a current flow through the product to be cooked. As the current increases to a maximum predetermined value, the voltage is decreased to maintain the desired current value. When the voltage decreases to a predetermined value the voltage then remains constant. The applied voltage can also be controlled by a timer, or other device, that switches the starting voltage to a lower final voltage in one or more steps.

As the food cooks, the current rises to a maximum value, then begins to drop when the product nears doneness. When the current decreases to a predetermined value, the controller circuit shuts off the power through the electrodes and switches the solenoid value opening the press.

In the preferred embodiment, if less than a well done state of the food product is desired, the controller is switched to temperature mode and a probe is inserted in about the middle of the product being cooked. The controller then operates the press as previously stated, but the cooking voltage termination and the press opening are actuated when the internal temperature of the product reaches a predetermined value as opposed to relying solely on the rate of change of the current flow being measured. After the electrodes are withdrawn by the press, the electrodes can continue to be heated readying the device either for re-application of a new food product or to act as a warming device for the product which has just been cooked, depending on the desire of the operator.

DETAILED DESCRIPTION OF THE INVENTION

Figure 1:
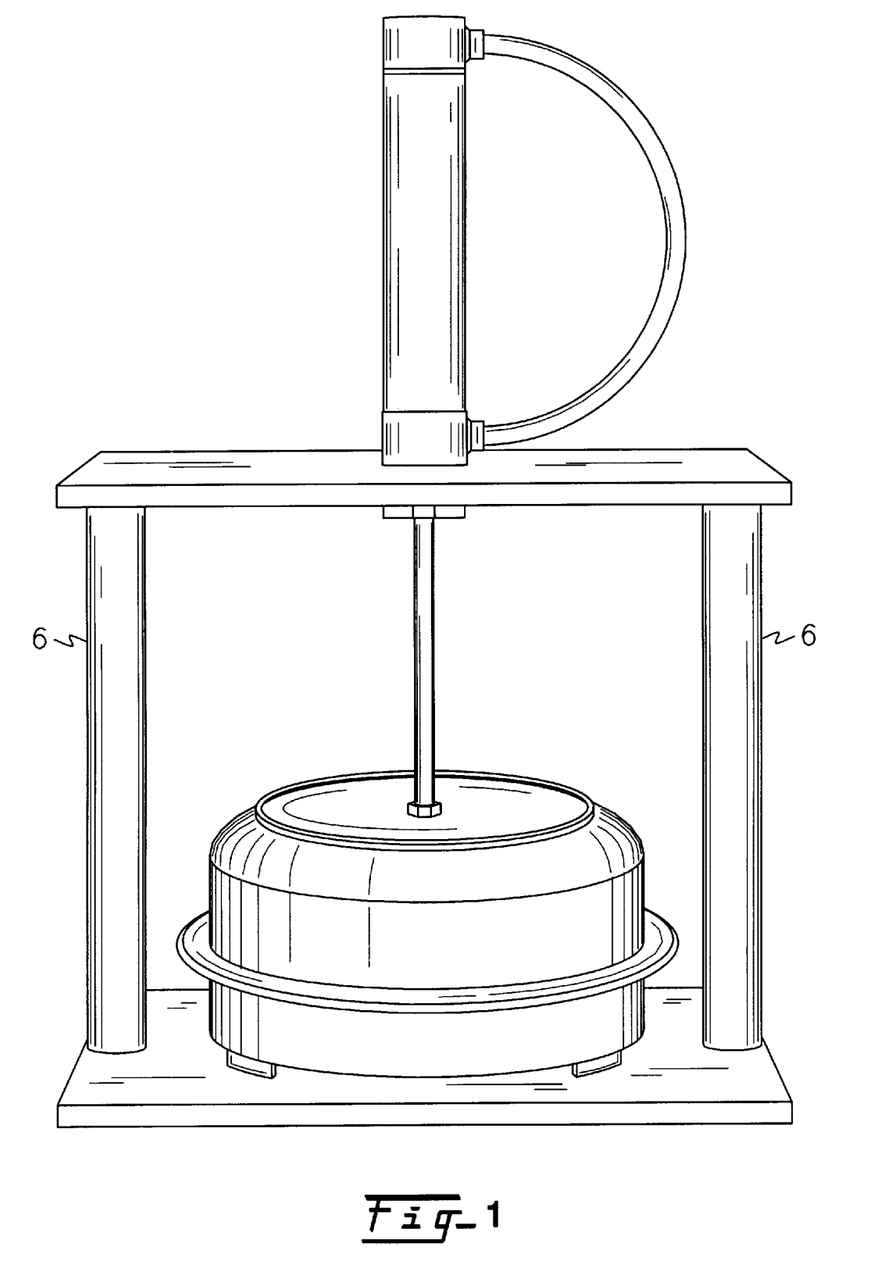
FIG. 1 is a pictorial diagram of the invention showing a prototype of the cooking apparatus with the upper and lower electrical cooking plates in the compressed position, with the hydraulic extended in the fully compressed, downward position.
Figure 2:
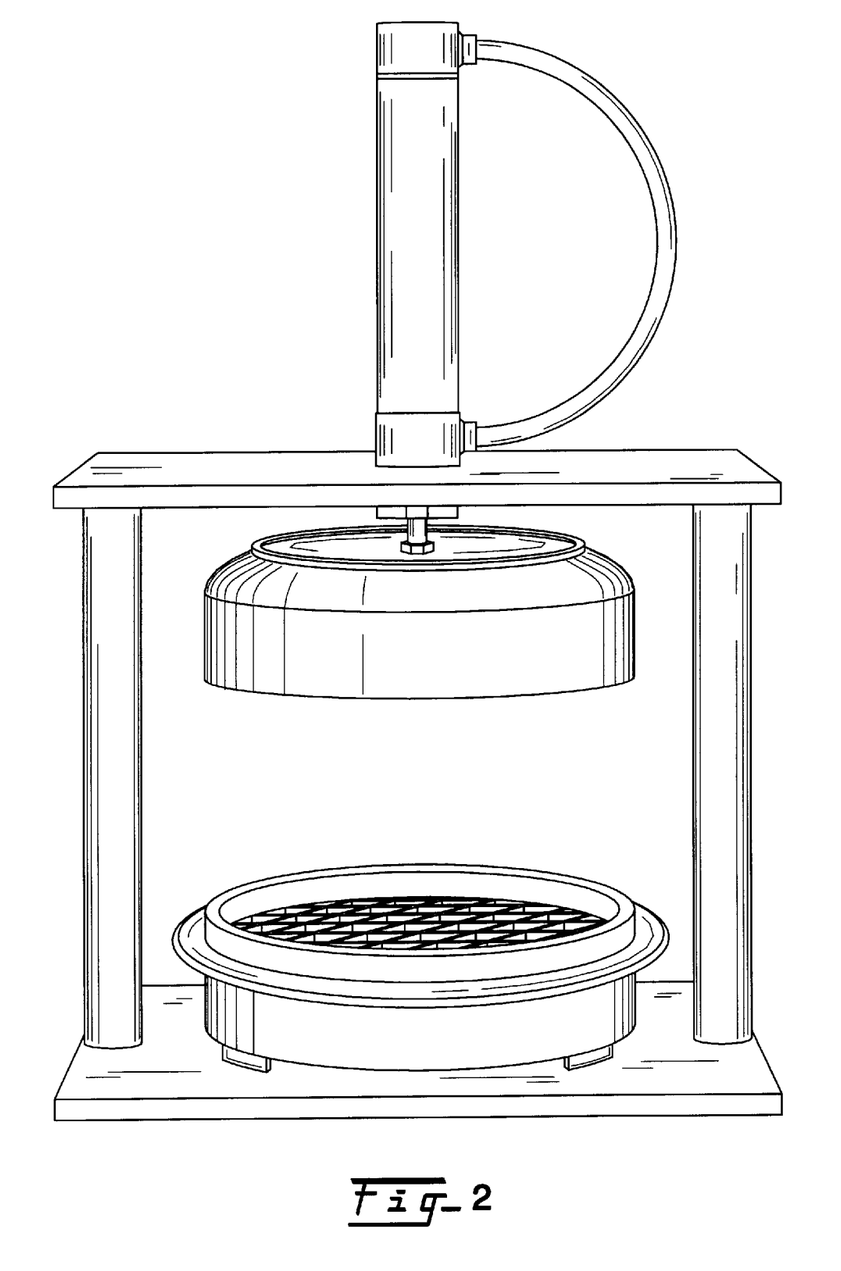
FIG. 2 is a pictorial diagram showing the electrical cooking apparatus with the cooking plates fully retracted, and the hydraulic tube operating the top plate housing the extension air cylinder shaft completely.
Figure 3:
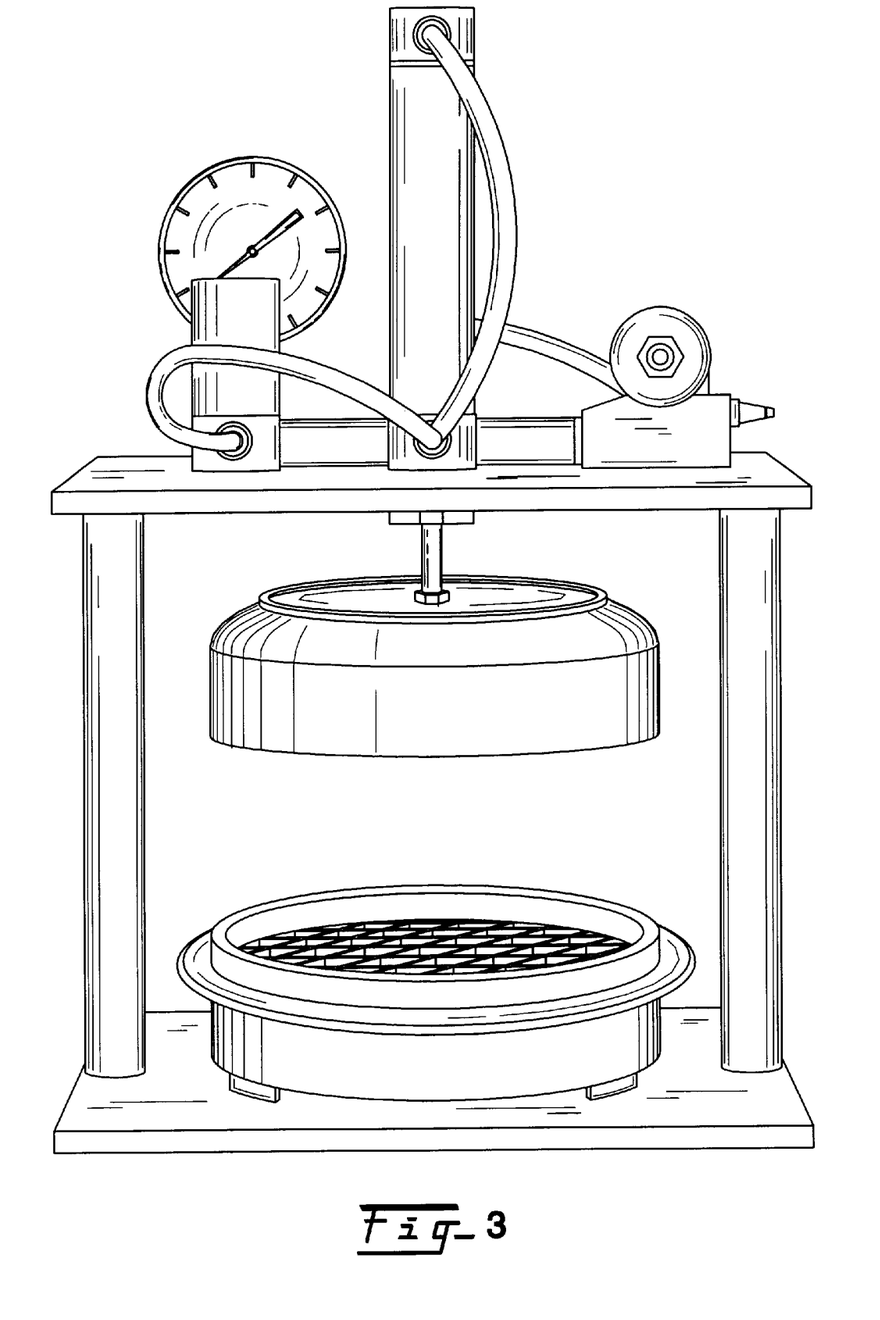
FIG. 3 is a pictorial diagram showing the electrical cooking apparatus with the cooking plates partially retracted and further illustrating the prototype hydraulic control apparatus with the hydraulic tube operating the top plate housing.

The invention will now be described with reference to the various drawings wherein like numbers refer to similar parts. FIG. 1, FIG. 2 and FIG. 3 illustrate the prototype of the present invention by way of pictorial presentation. FIG. 1 shows the cooking apparatus with the top moveable platen 10 containing the top electrode in the fully extended, cooking position. FIG. 2 shows a prototype of a cooking apparatus with a top platen 10 in the fully retracted position, illustrating the movement of the top cooking electrodes relative to each other. FIG. 3 is yet another view of the prototype cooking apparatus, illustrating on the top press plate 4, the layout of various hydraulic cables and gauges which allow for movement of air cylinder shaft 8 contained in air cylinder 2. It can be appreciated by considering FIG. 3 that to activate the cooking apparatus to place the cooking electrodes 26 together, air must be introduced into air cylinder supply fitting 22 and retracted from air cylinder supply fitting 24. Likewise, but in reverse fashion, to retract the platen 10 the opposite action would be necessary as one skilled in the art could appreciate.

Figure 4:
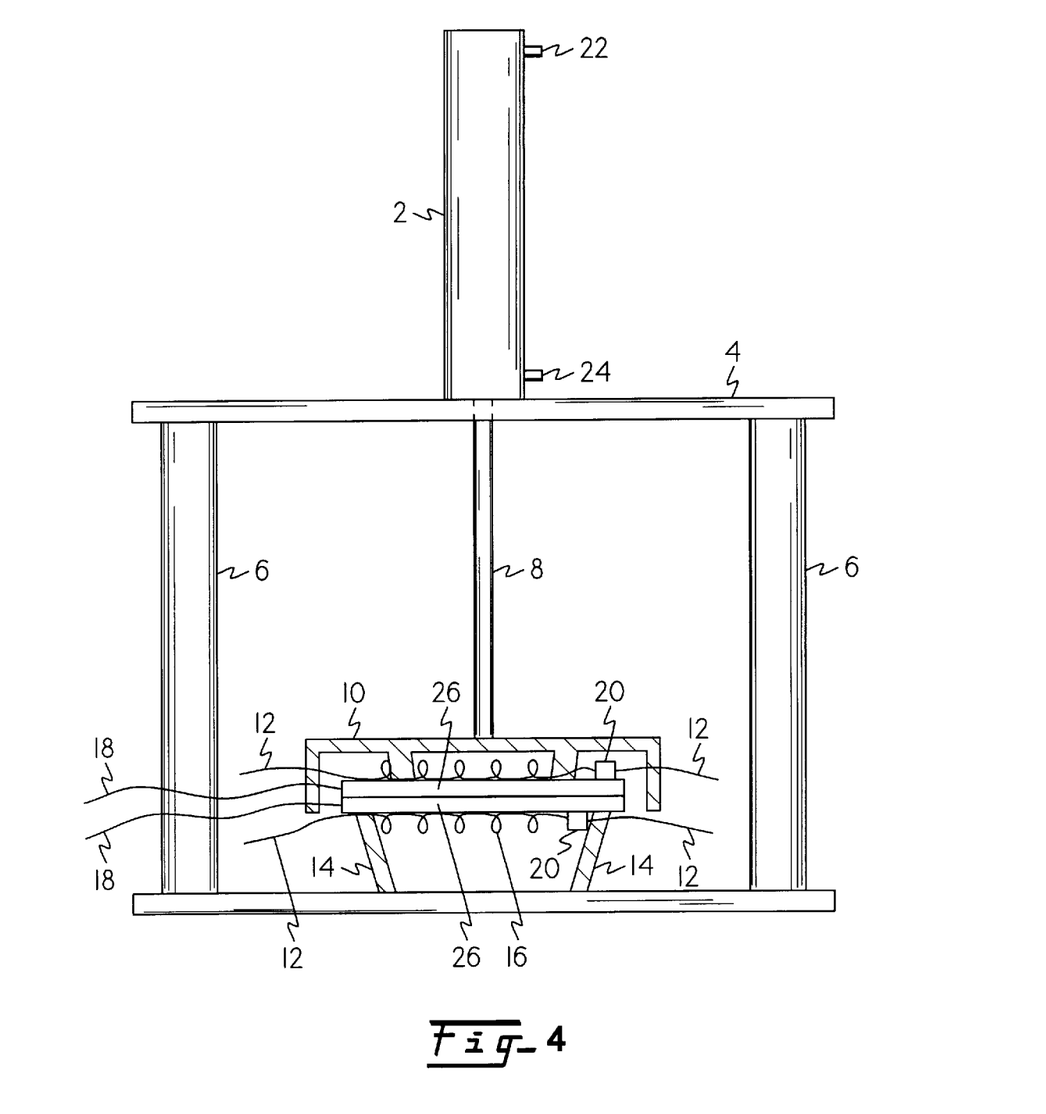
FIG. 4 is a schematic diagram of the electrical resistance cooking apparatus illustrating a side view of the apparatus, particularly pointing out the constituent elements of the apparatus as described in the present disclosure.

FIG. 4 is a schematic diagram of the apparatus illustrating the constituent parts of the invention. Of particular importance are electrodes 26, which are the metal plates which apply the electric current across the food product to be cooked. By applying AC power of sufficient voltage across electrodes 18, electric current can be conducted across the food, providing the resistance cooking desired controlled as described below.

It can also be appreciated that the heating of electrodes 26 can occur by using electrode heater wires such as Nichrome or other such conventional heating techniques by the power supplied by wires 12. As mentioned above, one of the advantages of the present invention is to apply not only electrical cooking of the food product itself through conduction of current through the food, but also to apply heat on the electrodes supplying the current, such as to facilitate browning or other desired affects to enhance the appearance and texture of the food product such as a meat patty.

In the present invention, it could be appreciated that the mechanical structure consists of the top press plate 4, tie bar 6 and the lower platen support structure 14. The various different configurations are possible and will be readily apparent to one skilled in the art when viewing the present disclosure. It would be possible to have a multiple meat patty processor, allowing a large volume of meat patties or other food products to be processed at one time. Likewise, it would be possible to have multiple presses configured in one apparatus to allow custom cooking of each food product depending upon the requests of the customer.

Figure 5:
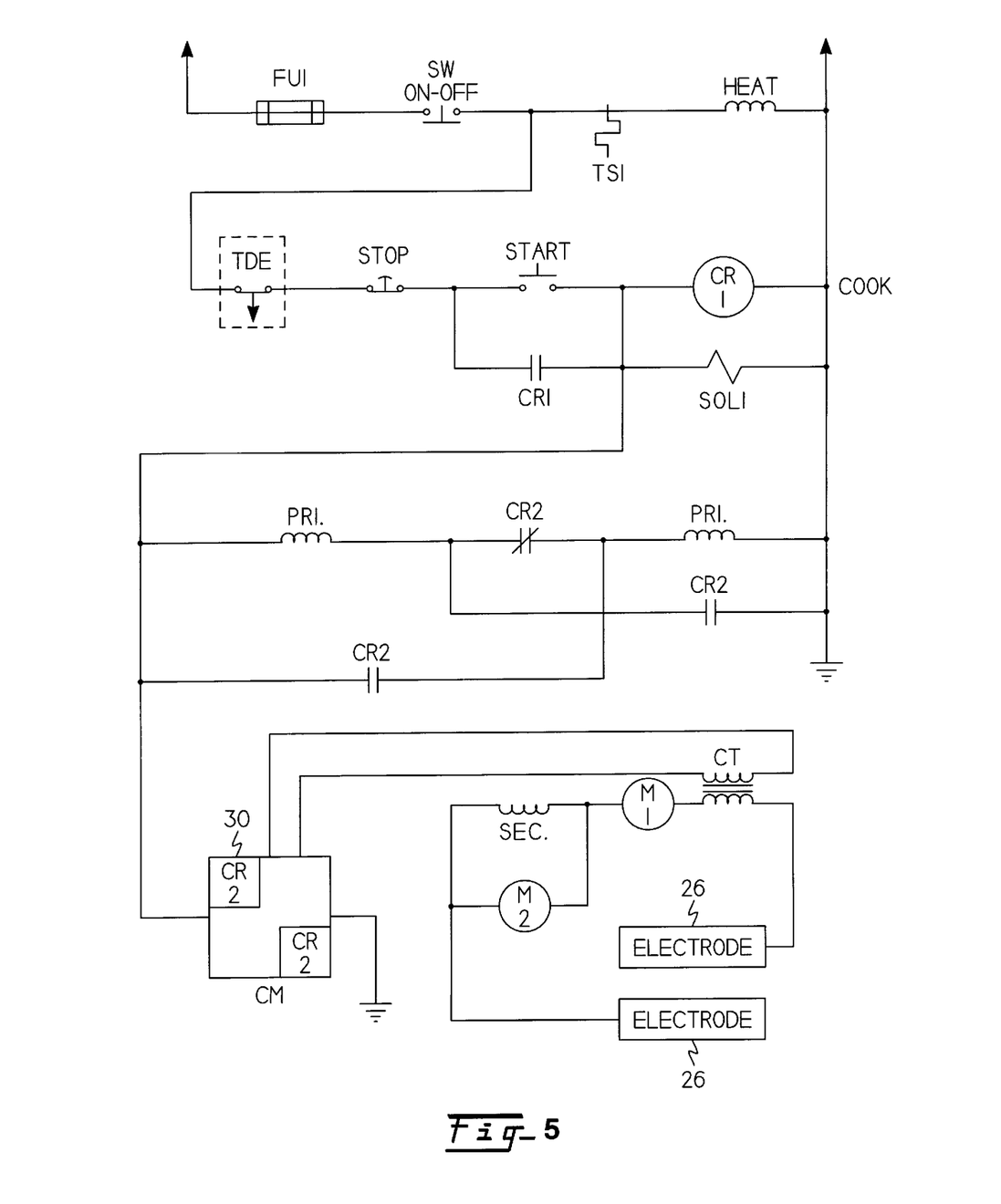
FIG. 5 is an electrical schematic diagram showing a first embodiment of the control circuits used for the present invention.
Figure 6:
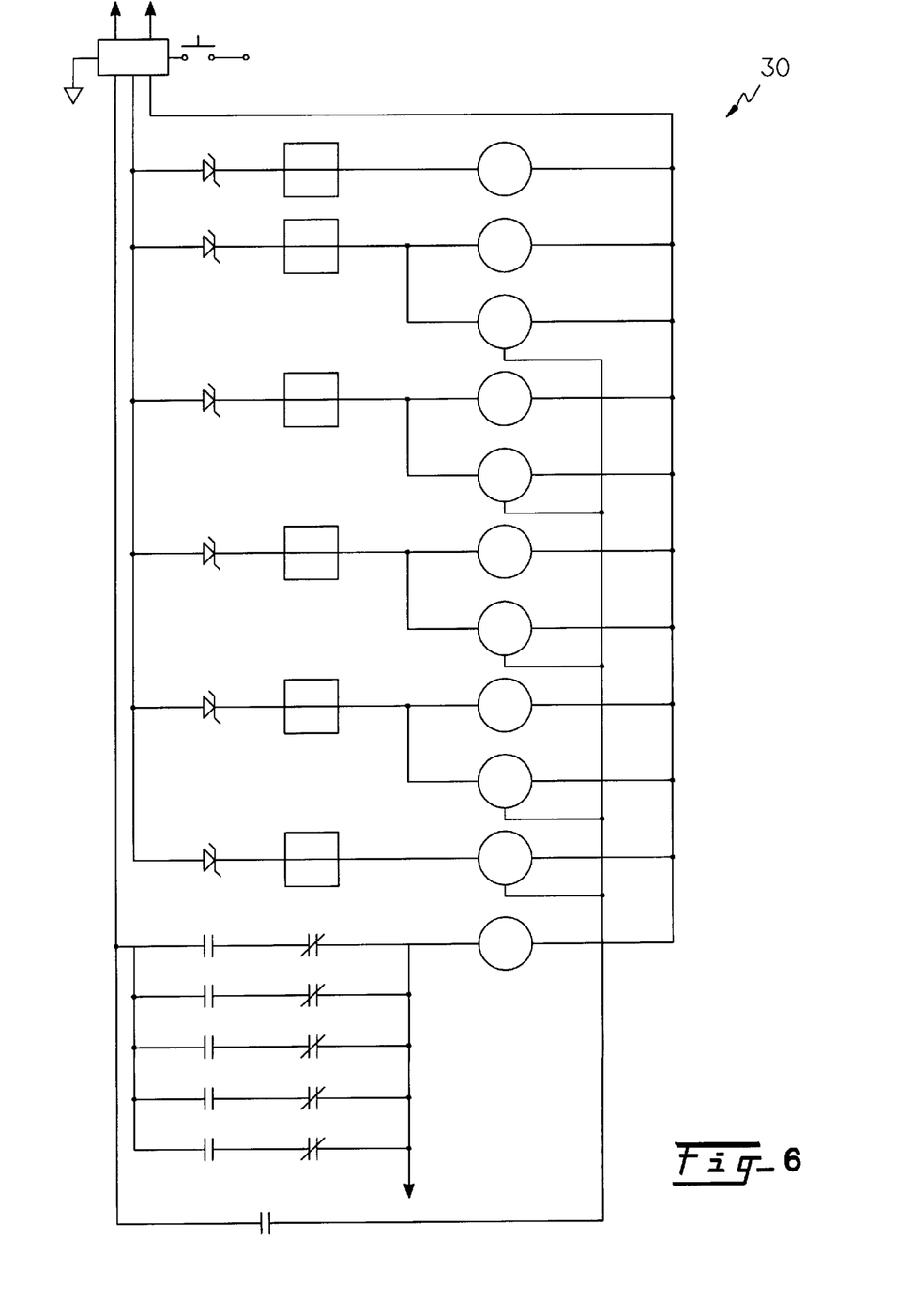
FIG. 6 is an electrical schematic diagram specifically illustrating the current monitor used in the first embodiment of the present invention.

Turning to FIG. 5 and FIG. 6, an electronic circuit which functions well in the present invention is disclosed. FIG. 5 shows the entire electrical circuit used, referring to current monitor 30 as a module which is described specifically on FIG. 6. Also, electrodes 26, in their electrical schematic presentation are illustrated on FIG. 5. The function of current monitor 30 is to regulate the voltage across electrodes 26, when such electrodes are conducting current through a food product, such as to limit the current to a level desired for proper cooking as well as monitor the current to measure when the rate of change of current indicates that cooking of the food products should cease. Although it depends on the level of "doneness" of a meat product as may be desired by the user, it has been observed, and reported in the prior art, that current flow begins to decrease through a given meat product at the point the cooking is complete through the entire product. Variations on the level of cooking can be accomplished by the monitoring of the rate of change of the current, and indeed the current flow itself, across electrodes 26. For different types and sizes of food products, empirical information and trials can provide a wealth of information to provide for consistent, and well controlled cooking of meat products of a particular size and shape such as hamburger patties or other fast food products. The present invention is well suited to adoption of such methods and the current monitor 30 described in FIG. 6 can be altered using conventional techniques, well known to those skilled in the art of designing such current control devices, to control current flow to the precise amount that is desired by the operator of the resistance cooking apparatus, depending upon the particular types of products to which the apparatus is used.

Figure 7:
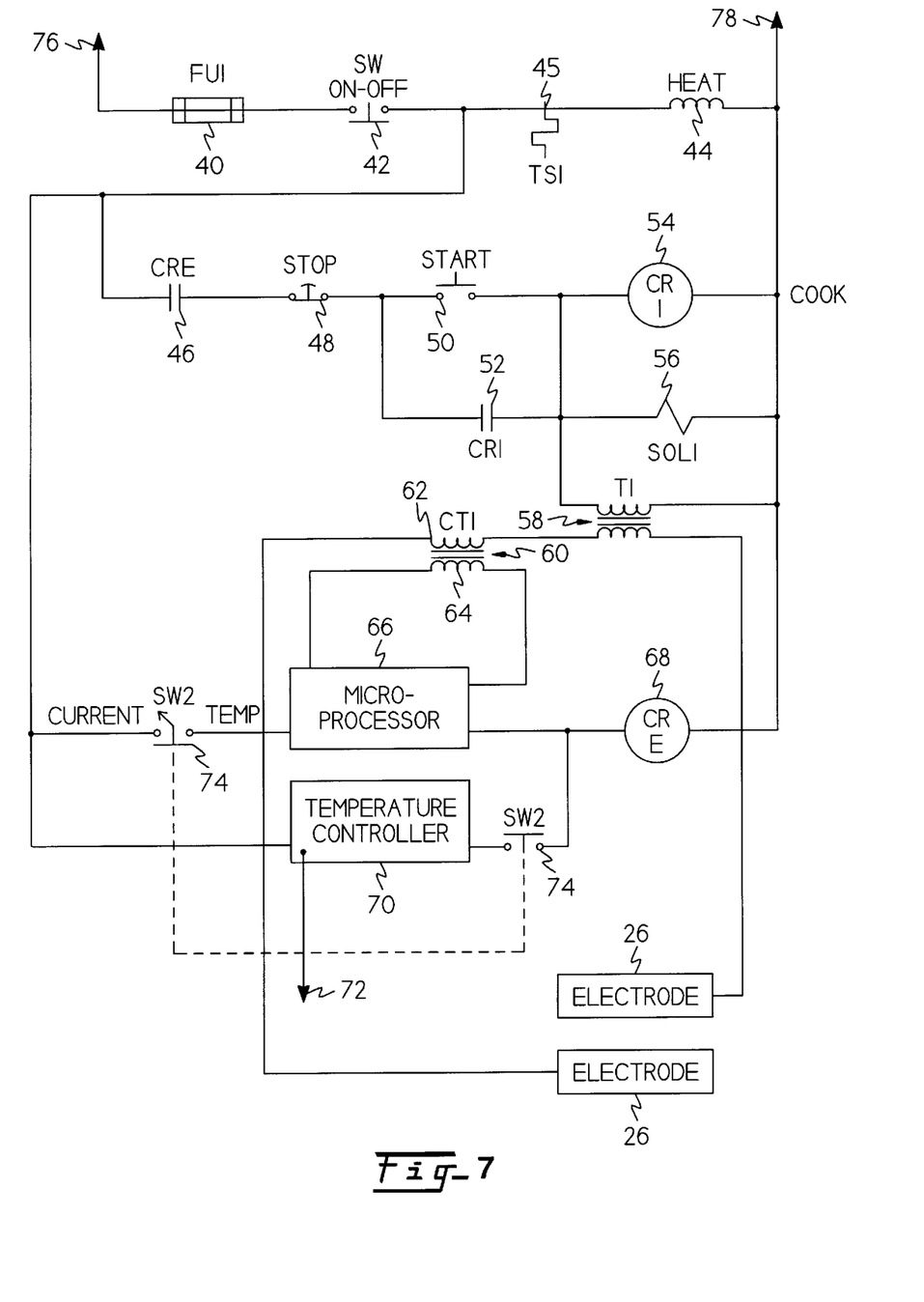
FIG. 7 is an electrical schematic diagram showing a second embodiment of the control circuits used for the present invention.

The second embodiment of the electronic control circuit for the present invention is shown in FIG. 7. The operation of the electronic control circuit shown in FIG. 7 will now be described in detail, referring to such parts as indicated on the drawing. The operating voltage, in this case, 110 volts AC, is applied to main power input 76 through fuse 40 and is controlled by the main operating switch 42. When switch 42 is in the active position, operating voltage is suppled through heat element temperature switch 45 to the browning heat coil element 44. Bus 78 represents the common neutral power ground throughout the circuit disclosed.

Heat element temperature switch 45 controls the temperature of the heating coil which is built into both electrodes 26 to provide surface heating of the product being cooked. The preferred temperature of the surface contacting the food product is approximately 325 degrees Fahrenheit, but other temperatures may work satisfactorily. It has been determined that the use of the heating element providing surface heat to the electrode plates substantially improve the quality of the cooking process. When cooking meats, such as hamburger patties, without a hot plate as described in the present invention, the cooking through the electrode current conduction provides an undesirable texture of the meat product being cooked. The heat element provides a searing effect on the surface of the meat, thereby sealing in the moisture of the product being cooked and greatly improves the cooking process. Heat element temperature switch 45 is similar to those switches used in waffle irons or other similar cooking components. Electing power switch 42 in the on position also provides primary operating voltage to the normally open relay contact 46 which is controlled by the power control relay activation coil 68. Also, the main operating voltage is supplied to the microprocessor current controller 66 and the temperature control module 70, as shown in FIG. 7. Stop switch 48 and start switch 50 provide safety control operating momentary contact switches which can start or stop in the automatically controlled cooking process which will be described below. Switch 48 breaks the primary power and start switch 50 activates control relay 54, thereby allowing normally open relay contact 52 to latch in and remain in the on position to continue the cooking process described. Pneumatic cylinder activation solenoid 56 controls an air pressure force which introduces the air pressure or other hydraulic fluid pressure to control air cylinder 2 which operates cylinder shaft 8 as described earlier and as illustrated in FIG. 4.

Main power for the voltage to be introduced to electrodes 26 to introduce current through the food product is provided by the electrode power transformer 58. By considering schematic diagram in FIG. 7, it could be appreciated that, on activation of normally open relay contact 46, and assuming the stop switch has not been activated, an operating voltage will be supplied to the primary of electrode power transformer 58 when normally open relay contact 52 is closed through the operation of its related relay activation coil 54 upon the activation of start switch 50. The primary of transformer 58 produces a voltage across the primary coil of the primary power introduced at main power 76, normally being 110 volts AC. The secondary of main electrode power transformer 58 produces a voltage in the preferred embodiment of approximately 42 volts AC, being the limit of voltage allowed for such devices through safety regulations such as those promulgated for food processing equipment by OSHA.

Figure 8:
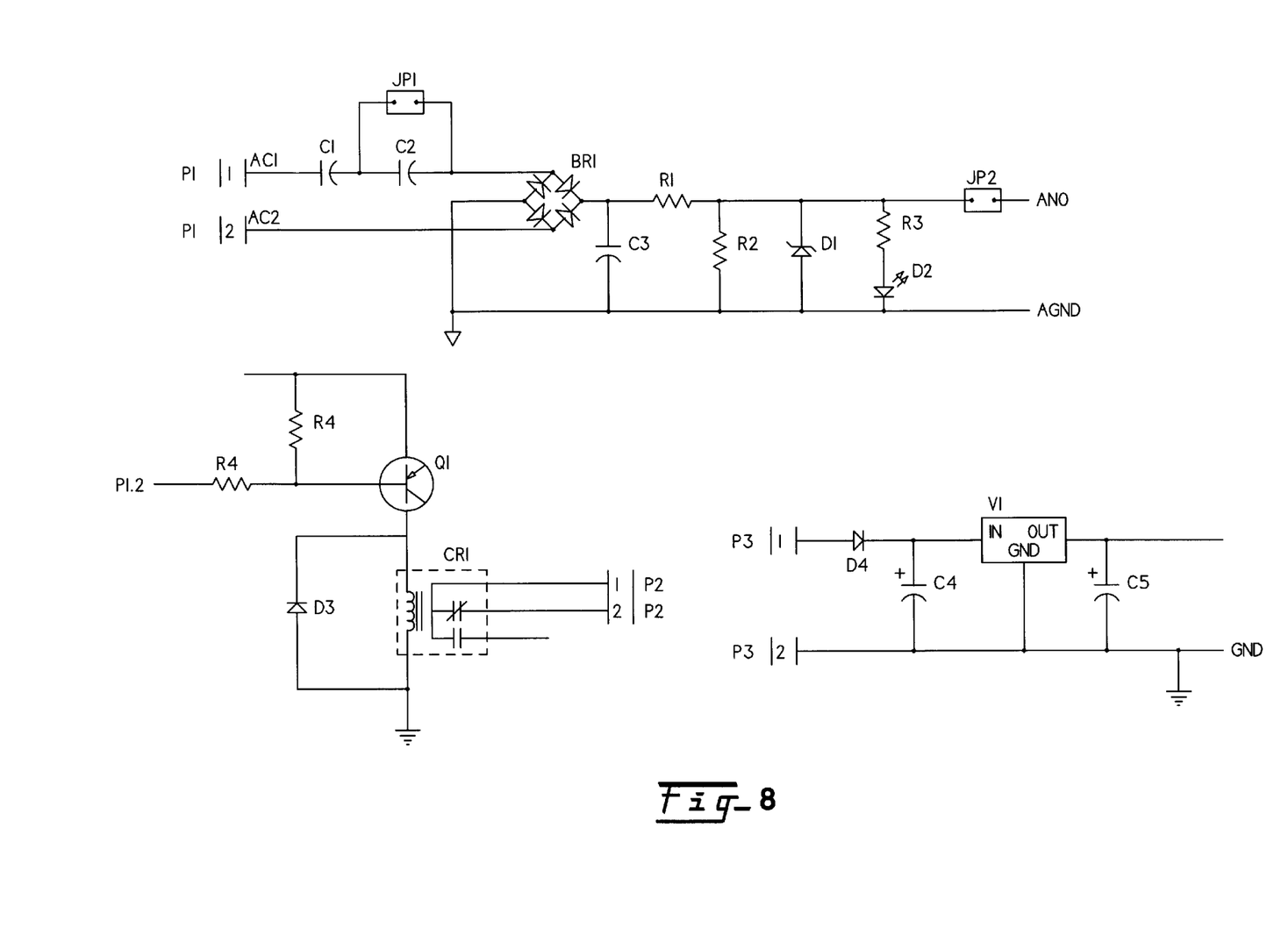
FIG. 8 is an electrical schematic diagram providing certain details of the current control microprocessor illustrated in FIG. 7.

One end of the constant current transformer primary 62 is connected to the secondary of the electrode power transformer 58, while the secondary of the current transformer 60 is introduced into the microprocessor control circuit 66, the details of which are also shown in FIG. 8. Transformer 60 allows a voltage to be developed across constant current transformer secondary 64 allowing the voltage analog across transformer secondary 64 to be a function of the current through transformer primary 62. This allows the voltage being generated across transformer secondary 64 to accurately track the current flowing between electrode 64 as it builds up through the food product being cooked.

At the beginning of the cooking process, current being conducted through the food product being cooked begins at zero and slowly builds up towards a peak current of approximately 23 amps as observed in testing. As this current rises through the cooking process, the voltage across secondary 64 rises accordingly, thereby presenting an analog voltage to microprocessor current controller 66 so that it may determine the rate of change of current being conducted through the electrodes 26.

The circuit described at the top of FIG. 8 illustrates the current transformer control circuit across which the voltage present in constant current transformer secondary 64 is introduced across a wheatstone bridge rectifier circuit as shown. Microprocessor current controller 66 is available as a separate component such as a Seaman's model no. 80C535 or a compatible core Intel product no. 8051. Microprocess controller 66 will control power control relay activation coil 68, thereby shutting off the main power to electrode 26 when the cooking process has been completed as measured by the rate of change of current flowing between the electrodes 26. Upon reaching the correct level of decrease in current, determining that a food product has been cooked through as desired, microprocess controller 66 will release the control relay 68 thereby shutting off the current and also automatically activating solenoid 56 thereby raising the platens containing the electrodes. Thus, the cooking process can be made automated and release the product being cooked without the manual activation by an operator through a lever or other operating handle.

In FIG. 7, it is also illustrated how the temperature sensor 72 can be used to control the cooking as an alternative to the current sense microprocessor controller 66. Switch 74, the double gang two pole switch as shown, can be selected in the current position thereby providing primary power to the input of microprocessor controller 66, or may be selected in the temperature position thereby connecting the output from temperature controller 70 through the second gang of switch 74. When selected in the temperature position, it can be appreciated that the primary power is disengaged from the microprocessor controller 66, thereby allowing control of main power control activation coil 68 only by the temperature sensor. In this mode, temperature probe 72 may sense the internal temperature of a meat product or other product being cooked whereby the selection and control of the cooking process and the release of solenoid 56 is controlled simply by reaching the set point temperature dialed into controller 70. Controller 70 used in the present invention is a Honeywell model DC9T0DTA0000, a controller used in ovens or other cooking apparatus to be controlled through the use of a probe as shown in 72. It has been determined that having the switch available to change modes of current cooking from current drop activation to temperature set point activation allows for cooking such products as steaks when a rare or medium rare condition is sought. In the preferred embodiment, temperature module 70 operates as a temperature indicator when not selected as a controller. In such a fashion, the internal temperature of a meat product may be monitored even though the controller 70 is not activated to control the cooking process such as is the case when current flow monitoring is used to measure the state of doneness of the product being cooked between electrodes 26.

Turning again to FIG. 8, capacitor C-1 and capacitor C-2 are used to reduce the AC voltage produced by the current transformer 60 monitoring the current through electrodes 26. The voltage reduced is sensed by the analog digital processor after passing through the filter shown in the top circuit described in FIG. 8, and the peak voltage limiting network also described. The processor current controller 66 can be programmed to generate a signal to terminate the cooking process at any percentage of maximum current by adjusting the gang control described as JP-1 on FIG. 8. This gain control acts as a set point which can be adjusted by tables or by empirical data obtained through a calibration set up of a particular cooking apparatus, and can be adjusted as the components age.

Other uses of the invention will become apparent to those skilled in the art.

I claim:

1. A food cooking control for an electric resistance cooker in which the value of electrode current generated from a voltage source passing through food interposed between electrodes increases until the food is substantially cooked, the improvement comprising: an electric supply circuit;

current control means arranged in an electric supply circuit for uninterruptedly supplying continuous cycle to said electrodes while the food is cooking, said current control means including a gate control element having an electric gate voltage supply circuit;

switch means in said gate voltage supply circuit for selectively closing and opening the gate voltage circuit and respectively rendering said current control means conductive and nonconductive;

current detection means connected with the electric supply circuit through a current transformer for sensing the rate of change of the value of current through the food as a function of its cooked condition; and, electric switch operator means including an electric circuit interposed between said current detection means and said switch means for opening the gate of the voltage supply circuit in response to a predetermined rate of change of the current through the food indicating the end of the cooking process and a selected cooking doneness of the food;

pneumatic control means operatively connected to said current detection means to operate upon a preset rate of change in said current.

2. The combination according to claim 1 in which said pneumatic means includes:

a moveable platen containing at least one of said electrodes; and, a mechanical activator means to activate said movable platen.

3. The combination according to claim 2 in which said pneumatic control means includes:

a means to activate said mechanical activator means to left said platen away from said food interposed between said electrodes upon a predetermined state of doneness.

4. The method of controlling power input during electrical resistance cooking of food, comprising: interposing food to be cooked between spaced-apart electrodes;

uninterruptedly applying continuous electric potential across the electrodes;

continually sensing the current passing through the food; and, discontinuing the electrode current in response to a predetermined rate of change of the value of the current as a function of the cooked condition of the food indicating the end of the cooking process and a selected cooking doneness of the food; and, automatically moving at least one said spaced apart electrodes away from the food upon said discontinuing of the electric current.

5. The method of cooking food in an electrical resistance cooker in which the magnitude of electrode current generated from an a current source passing through food between electrodes increases until the food is substantially cooked, comprising:

selecting a desired done condition of the food to be cooked;

uninterruptedly applying the continuous cycle source to the electrodes;

continually sensing the rate of change of the RMS value of the electrode current passing through the food;

discontinuing the electrode current in response to a sensed predetermined rate of change in the current value of the electrode current magnitude as a function of the cooked condition of the food indicating the end of the cooking process and a selected cooking doneness of the food; and, automatically moving said electrodes away from said food upon the discontinuing of said electrode current.

* * * * *